Figures 1, 2:
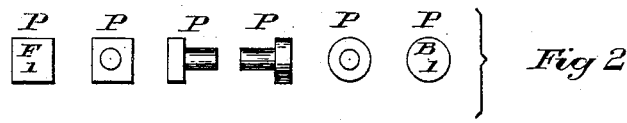

J. C. WINDER.
Car-Indicator.

No. 208,780.   Patented Oct. 8, 1878.

Attest:
J. B. Hunter
B. R. Harding

Inventor
Jno. C. Winder

UNITED STATES PATENT OFFICE.

JOHN C. WINDER, OF RALEIGH, NORTH CAROLINA.

IMPROVEMENT IN CAR-INDICATORS.

Specification forming part of Letters Patent No. 208,780, dated October 8, 1878; application filed January 7, 1878.

*To all whom it may concern:*

Be it known that I, JOHN C. WINDER, of the city of Raleigh, in the county of Wake and State of North Carolina, have invented a new and useful device for indicating the location or whereabouts of cars, by which the cars belonging to a road may be traced to its several connecting roads, and thus to be able to see at a glance how many cars are absent and to what road they should be charged, the method of keeping such record being fully set forth in the following specification.

The invention consists of a painted board of suitable size, laid off in spaces to indicate the number of connecting roads, and each space being of different color and marked with the initials of the road it represents, and each space pierced with holes, in combination with sets of pins, constructed as hereinafter described, to denote the peculiar kind of cars and their numbers. In the holes of the space representing the road keeping the record are inserted pins marked with the letter representing the kind of car—B for box-cars, F for flat cars, &c. For greater convenience, the box-cars are represented by round-headed pins, and flat cars by square-headed pins. Each pin is numbered to correspond to the number of each car, so that each car owned by the company is represented by a pin with corresponding number in the board.

When a car leaves the road the pin corresponding to its number is taken out and inserted in a hole in the space allotted to the road to which the car has gone; and this is done in all cases of departure. On the return the pin representing the car returned is extracted from the space in which it is found, and inserted in the space representing the home road.

The column containing the series or sets of pins represents the home road or station at which the record is kept; the others, in which the pins are placed from time to time, connecting roads.

Figure 1 is a front view of my device, and Fig. 2 represents the pins employed to indicate the different kinds of cars and the numbers thereof.

By this record the officer having in charge the movement of cars can see at a glance how many cars he has on his road, and how many of his cars are absent, and where they are.

What I claim is—

The indicator hereinbefore described, consisting of a base divided into vertical columns, each of which is distinguished from the other by a contrasting facing, and provided with perforations and indicating-marks, and the sets or series of indicating-pins, substantially as and for the purpose set forth.

JNO. C. WINDER.

Witnesses:
J. B. MARTIN,
B. R. HARDING.